US009758430B2

(12) United States Patent
Van Hoof et al.

(10) Patent No.: US 9,758,430 B2
(45) Date of Patent: Sep. 12, 2017

(54) TWO PART SIZING COMPOSITION FOR COATING GLASS FIBRES AND COMPOSITE REINFORCED WITH SUCH GLASS FIBRES

(71) Applicant: 3B-Fibreglass sprl, Battice (BE)

(72) Inventors: Frédéric Van Hoof, Battice (BE); Nadia Masson, Battice (BE)

(73) Assignee: 3B-Fibreglass sprl, Battice (BE)

( * ) Notice: Subject to any disclaimer, the term of this patent is extended or adjusted under 35 U.S.C. 154(b) by 0 days.

(21) Appl. No.: 14/387,100

(22) PCT Filed: Mar. 15, 2013

(86) PCT No.: PCT/EP2013/055425
§ 371 (c)(1),
(2) Date: Sep. 22, 2014

(87) PCT Pub. No.: WO2013/139708
PCT Pub. Date: Sep. 26, 2013

(65) Prior Publication Data
US 2015/0051313 A1    Feb. 19, 2015

(30) Foreign Application Priority Data

Mar. 20, 2012  (EP) .................................. 12160284

(51) Int. Cl.
*C03C 25/36*    (2006.01)
*C03C 25/28*    (2006.01)
(Continued)

(52) U.S. Cl.
CPC .............. *C03C 25/36* (2013.01); *C03C 25/28* (2013.01); *C03C 25/40* (2013.01); *C08G 59/3218* (2013.01); *C08G 59/42* (2013.01); *C08J 5/08* (2013.01); *C08K 3/40* (2013.01); *C08K 9/06* (2013.01); *C08L 63/00* (2013.01); (Continued)

(58) Field of Classification Search
CPC ......... C03C 25/28; C03C 25/36; C03C 25/40; C09D 163/00–163/10; C09D 133/04; C09D 133/064; C09D 133/02; C09J 163/00–163/10; C09J 133/04; C09J 133/064; C09J 133/02; C08L 33/04; C08L 33/064; C08L 33/02; C08L 2203/12; C08J 5/08; C08J 2363/00–2363/10; C08J 2333/02; C08J 2333/064; C08J 2367/02; C08K 3/40; C08G 59/42; C08G 59/3218
See application file for complete search history.

(56) References Cited

U.S. PATENT DOCUMENTS

2004/0258912 A1    12/2004  Piret et al.
2008/0241533 A1*  10/2008  Dijt .................. C03C 25/26
                                                              428/375

* cited by examiner

*Primary Examiner* — Kregg Brooks
(74) *Attorney, Agent, or Firm* — Avery N. Goldstein; Blue Filament Law PLLC

(57) ABSTRACT

The present invention concerns a two-part sizing composition comprising: (A) A precursor comprising: (a) An aminosilane (e.g. A1100) and (b) a polymer or copolymer containing carboxylic acid and/or anhydride, both having a functionality, F≥3, and (B) A binder comprising a multifunctional epoxy resin of functionality, F≥3. Glass fibres sized with the reaction product of the above composition yield a higher resistance to hydrolysis of polymeric matrix composite materials reinforced with such fibres. The sizing composition of the present invention is particularly advantageous for use with polyester resins, such as PET.

6 Claims, 3 Drawing Sheets

(51) Int. Cl.
  *C03C 25/40* (2006.01)
  *C03C 25/10* (2006.01)
  *C03C 25/26* (2006.01)
  *C08G 59/32* (2006.01)
  *C08G 59/42* (2006.01)
  *C08L 67/02* (2006.01)
  *C08L 23/02* (2006.01)
  *C08L 35/00* (2006.01)
  *C08L 63/00* (2006.01)
  *B29C 70/10* (2006.01)
  *C08J 5/08* (2006.01)
  *C08K 3/40* (2006.01)
  *C08K 7/14* (2006.01)
  *C09D 133/02* (2006.01)
  *C09D 163/04* (2006.01)
  *C09D 135/00* (2006.01)
  *C09D 7/12* (2006.01)
  *C08K 9/06* (2006.01)

(52) U.S. Cl.
  CPC ........... *C08L 67/02* (2013.01); *C08J 2363/00* (2013.01); *C08J 2367/02* (2013.01); *C08L 2203/12* (2013.01); *C08L 2205/03* (2013.01); *Y10T 428/2962* (2015.01)

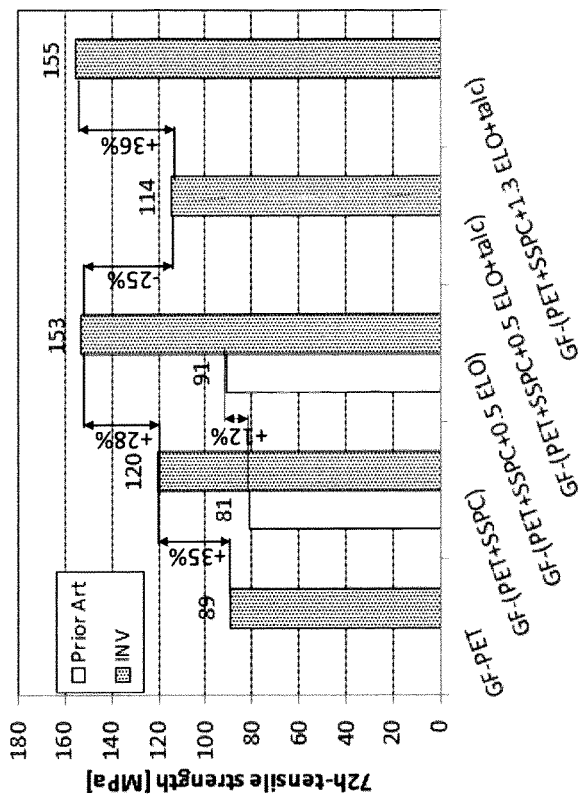
FIGURE 5
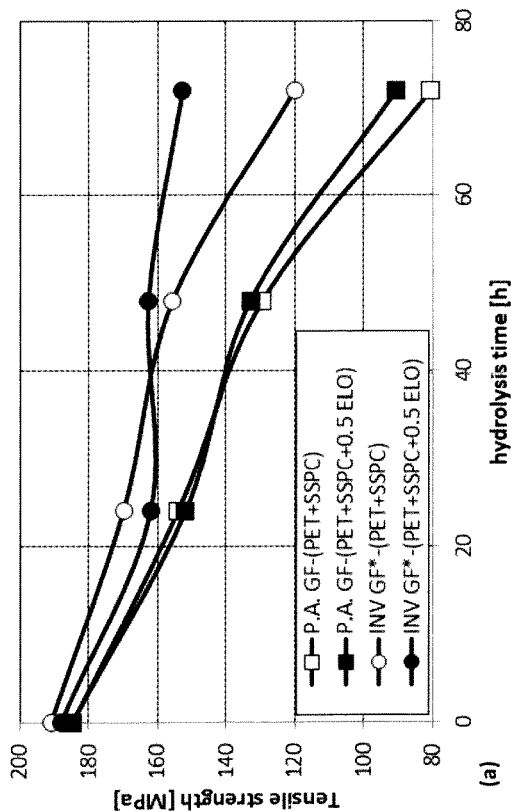
FIGURE 4
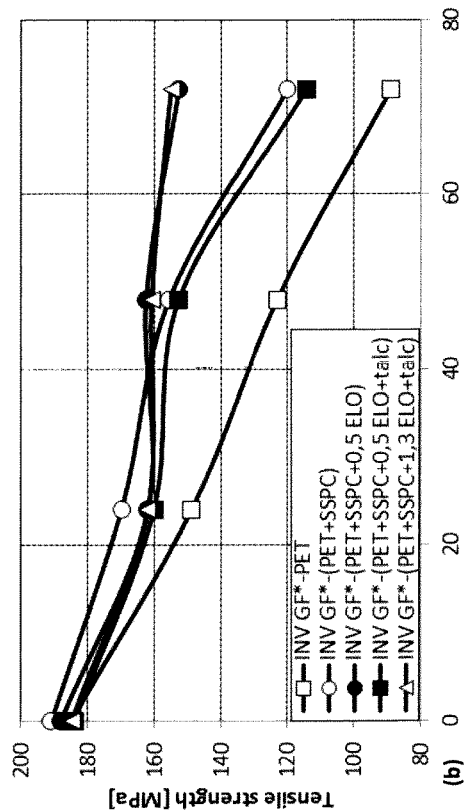

TWO PART SIZING COMPOSITION FOR COATING GLASS FIBRES AND COMPOSITE REINFORCED WITH SUCH GLASS FIBRES

TECHNICAL FIELD

The present invention relates to the field of glass fibre reinforced composites and, in particular, of silane based sizings for glass fibres enhancing the mechanical properties of polymeric composites reinforced with glass fibres coated with such sizing measured both dry as moulded (DAM) and after ageing in moist conditions. The sizing composition of the present invention is suitable for coating glass fibres for reinforcing various types of polymeric matrices, most particularly thermoplastic polyesters such as PET.

BACKGROUND FOR THE INVENTION

Polymeric materials have many attractive properties, but their mechanical properties are insufficient for many structural applications. Fibre reinforced composites, wherein approximately 6 to 25 µm diameter fibres having high stiffness and/or strength, typically carbon, glass or aramide fibres, are embedded in a polymeric matrix have substantially higher mechanical properties allowing to reach very advantageous mechanical properties to density ratios. The reinforcing fibres may be short, long or continuous. When the mechanical properties of continuous fibre reinforced composites can be very high, the geometry of parts made of such composites is limited mostly to thin wall geometries. On the other hand, although the mechanical properties of short fibre reinforced composites are lower than the former, there is no limit to the geometry of part manufactured therewith, as they can be produced by extrusion or injection moulding.

When a fibre reinforced composite is submitted to a stress field, the stress is transferred from the matrix to the fibres through the matrix-fibre interface. If the latter is strong, the whole load is transferred to the fibre and the mechanical properties are high. If, on the other hand, the interfacial bond between matrix and fibres is low, a crack may initiate at and propagate along the fibre-matrix interface resulting in a premature failure. It is therefore very important to enhance the bond between matrix and fibres. The mechanical properties of short fibre reinforced composites are particularly sensitive to the interfacial strength between polymer matrix and fibres, because of the short size of the latter.

In order to allow handling of the fibres and to enhance interfacial adhesion with the matrix they are embedded in, the fibres are coated with a sizing which composition depends on the nature of the reinforcing fibre to be sized and on the matrix the fibres are to be used with. Glass fibres are usually sized with a silane based composition since Si—O—Si covalent bonds can be formed between, on the one hand, the glass fibre surface and silanols obtained by hydrolysing of the alkoxysilanes of the sizing and, on the other hand, between adjacent silanol groups, thus forming a crosslinked structure at the surface of the glass fibres. This crosslinked structure seems to enhance the fibre resistance to corrosion, typically to hydrolysis. Adhesion of the sizing with the matrix can be enhanced by the organic function of the silane coupling agent and by a film former, which nature depends on the matrix used. Sizing compositions usually comprise other additive such as a lubricant, antistatic agents, and the like. Numerous sizing compositions for glass fibres have been proposed in the art, as e.g., in JP2006016559, JP2006016558, JP2006016557, WO2004110948, US5877240, WO9818734, US4448910, WO200149627, WO200048957, WO200836224, US20070154697, WO200767667, US20070072989, WO200431246, WO200356095, WO200353875, US20060083922, WO200288044, WO200026155, WO9855415, WO9742129, CA2127015, EP-635462, US5389440, and are reviewed in E. P. Pluedemann, "*Silane Coupling Agents*", Plenium Press (7982). Sizing compositions can be applied Sizing compositions can be applied to the fibre surface at a single coating station or, can be formulated as a two-part composition to be applied at two coating stations. The latter technique permits to formulate sizing compositions combining components which are reactive with one another, which would be unsuitable for a one-station application process because of their limited shelf life. Two part sizing compositions are usually composed of a precursor applied first to the surface of the fibres, and of a binder applied thereafter. They are most suited for chopped fibres, wherein the precursor is applied to the fibre surface as they are drawn out of a bushing. The precursor coated fibres are then chopped and collected into a container wherein they are coated with the binder, usually by spraying thus forming fibre pellets. A thermal treatment is then applied to the fibre pellets to evaporate water and to react the components of the sizing composition with the glass fibre surface and with one another.

The sized fibre pellets can advantageously be blended with a thermoplastic polymer in the screw of an extruder, wherein the fibre pellets are disrupted and the length of the fibres further decreased while they are homogenously mixed with the polymer; An extruded profile, generally in the shape of a wire, is chopped to form composite pellets of the polymer loaded with short glass fibres. Said composite pellets can be melted and shaped into a final part by injection moulding or extrusion.

The present invention proposes sizing compositions for glass fibres which yield high mechanical properties measured both dry as moulded (DAM) and after ageing in moist conditions. The sizing is particularly effective with thermoplastic polyester matrices. This and other advantages of the present invention are presented in the following.

SUMMARY OF THE INVENTION

The present invention is defined in the appended independent claims. Preferred embodiments are defined in the dependent claims. In particular, the present invention concerns a two-part sizing composition comprising:
 (A) A precursor comprising:
   (a) An aminosilane and
   (b) a polymer or copolymer containing carboxylic acid and/or anhydride, both having a functionality, $F \geq 3$, and
 (B) A binder comprising a multifunctional epoxy resin of functionality, $F \geq 3$ In a preferred embodiment, the anhydride contained in said polymer or copolymer is maleic anhydride, and/or the carboxilic acid contained is said polymer is polyacrylic acid. The total amount of polymer or copolymer containing carboxylic acid and/or anhydride of functionality, $F \geq 3$ is preferably present in the dry composition in an amount comprised between 5.0 and 60.0 wt. %, more preferably between 15.0 and 30.0 wt. %

In particular, said multifunctional epoxy resin may comprise a novolac type epoxy, preferably epoxy phenol novolac (EPN) or epoxy cresol novolac. Said multifunctional epoxy resin is preferably present in the dry composition in an amount comprised between 30 and 90 wt. %, more preferably between 50 and 70 wt. %. The aminosilane is preferably selected from one or more of an;
(a) aminodialkoxysilane, such as γ-aminopropylmethyldiethoxysilane, N-β-(Aminoethyl)-gamma-aminopropylmethyldimethoxysilane, N-β-(Aminoethyl)-γ-aminopropyl-methyldimethoxysilane, N-β-(Aminoethyl)-γ-aminoisobutylmethyldimethoxysilane, γ-aminopropylmethyldimethoxysilane, N-β-(Aminoethyl)-γ-aminopropyl-methyldiethoxysilane, and/or
(b) aminotrialkoxysilane, such as γ-aminopropyltriethoxysilane, γ-aminopropyltrimethoxysilane, N-β-(Aminoethyl)-γ-aminopropyl-tri-methoxysilane, N-β-(Aminoethyl)-γ-aminopropyltriethoxysilane, diethylenetriaminopropyltrimethoxysilane, Bis-(γ-trimethoxysilylpropyl) amine, N-phenyl-γ-aminopropyltrimethoxysilane, γ-amino-3,3-dimethylbutyltrimethoxysilane, γ-aminobutyltriethoxysilane, polyazamide silane.

Said aminosilane is preferably present in the dry composition in an amount comprised between 2.5 and 20.0 wt. %, more preferably between 5.0 and 15.0 wt. %.

The sizing of the present invention may also comprise a film former. Film formers preferably comprise a polyurethane or a (meth-)acrylate polymer or co-polymer, or mixtures thereof, said film former being preferably present in the precursor in an amount of 0.1 to 50.0 wt. % with respect to the total dry weight of the composition, more preferably 10.0 to 30.0 wt. %; It may further comprise additives selected from one or more of:
- pH adjusters, such as bases, preferably ammonia or sodium hydroxide, and acids, preferably acetic acid or phosphoric acid,
- a non-ionic lubricant, preferably a fatty alcohols ethoxylated or fatty acid monoester of polyethylene glycol, such as PEG 200 Monolaurate, PEG 600 Monooleate, PEG 600 Monostearate, PEG 400 Monostearate PEG 400 Monooleate, PEG 600 Monolaurate, the non-ionic lubricant being preferably present in an amount of 0.1 to 30.0 wt. % solids, more preferably from 1.0 to 20.0 wt. % solids, most preferably from 2.0 to 5.0 wt. % solids;
- a cationic lubricant, such as a polyethyleneimine polyamide salt, and is preferably present in the size composition in an amount from 0.1 to 30.0 wt. % solids, more preferably from 1.0 to 20.0 wt. % solids, most preferably from 2.0 to 5.0 wt. % solids,
- an antistatic agent, such as a quaternary ammonium, a tetraethylammonium chloride, or lithium chloride, and is preferably present in an amount of 0.1 to 5.0 wt. % solids, preferably from 0.5 to 1.5 wt. % solids.
- anti-foaming agents, such as polysiloxane derivatives, the anti-foaming agent being preferably present in amount of less than 0.1% of total weight of sizing without water,
- an isocyanate based cross-linker, such as an isocyanurate, biuret, carbodiimide, the isocyanate based cross-linker being preferably present in amount of 0.1 to 50% of total weight of sizing without water, more preferably between 10 and 30.0 wt. %;
- a boron-containing compound selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate; the boron containing compound is preferably present in an amount of 0.1 to 50.0% with respect to the total dry weight of the composition, more preferably between 10.0 to 30.0 wt. %, most preferably between 2.5 and 10.0 wt. %;

The present invention further concerns a glass fibre at least partially coated with the reaction product of a sizing composition as discussed above. The two-part sizing of the present invention may be applied to the surface of glass fibres with the following steps:
(a) Forming glass fibres out of a bushing,
(b) Applying the precursor of a sizing composition as discussed supra onto the surface of the glass fibres at a first application station,
(c) Applying the binder of a sizing composition as discussed supra onto the precursor coated surface of the glass fibres at a second application station, and
(d) Allowing the two-part sizing composition to react and form a sizing covalently bond to the surface of the glass fibres.

In a preferred embodiment, the glass fibres are chopped into short fibres after the application of the precursor, which is preferably applied with a roller, and before the application of the binder, which is preferably applied by spraying.

Glass fibres according to the present invention are advantageously used in a fibre reinforced composite comprising a polymeric matrix, which preferably comprises a thermoplastic polymer such as a polyester, more preferably PBT or PET, and most preferably PET. As understood by a person skilled in the art, a "polymeric matrix" in a fibre reinforced composite material is meant herein as the binding phase of a fibre reinforced composite. It comprises a polymer or blend of polymers and may comprise various additives, such as plasticisers, antiflame agents, pigments, and the like. The reinforcing glass fibres can be continuous, long, or short, and can be aligned following a given pattern or can be randomly distributed in the matrix. For short glass fibre reinforced composites, short, chopped glass fibres are generally blended with a polymeric melt in an extruder, a composite wire is drawn out of the extruder die and chopped to form short fibre reinforced polymeric pellets or granules, the two terms being considered herein as synonymous. Such composite pellets can then be melted again in the screw of an injection moulding machine or of an extruder to form final short glass fibre reinforced composite parts or continuous profiles, respectively.

In a preferred embodiment, composite pellets reinforced with glass fibres according to the present invention are formed in an extruder as explained supra by blending a thermoplastic polyester, preferably PET of relatively low molecular weight. After formation of the composite pellets, these are subjected to a solid state post condensation process (SSPC). This sequence has revealed an unexpected rise in the hydrolysis resistance, compared with the usual sequence of subjecting the polyester polymer to the SSPC before compounding it with glass fibres. The SSPC step is preferably carried out by exposing the composite pellets to a temperature comprised between 160° C. and 245° C., more preferably between 170° C. and 240° C., and preferably in an inert gas atmosphere at a pressure of less than 10 kPa, more preferably less than 1 kPa, even more preferably less than 500 Pa.

Additional increase in the hydrolysis resistance of polyester composites reinforced with the glass fibres of the present invention is obtained by adding a stabilizer to the polyester. The stabilizer is preferably added in an amount between 0.1 and 3.0 wt. %, more preferably between 0.5 and 1.5 wt. %, and should be selected from polycarbodiimide and/or an epoxy group containing stabilizer. The epoxy group containing stabilizer is preferably an epoxidized fatty acid ester or ether, preferably an epoxidized vegetable oil such as epoxidized soybean oil or talloil, or most preferably epoxidized linseed oil.

Nucleating agents are often necessary in PET, to increase the crystallization rate to values compatible with typical injection moulding process cycles. It is preferred that, if a nucleating agent is needed, it should be inorganic. Typical nucleating agents that can be added to a PET matrix reinforced with glass fibres according to the present invention are:
  (a) metal oxides, such as, titanium dioxide, magnesium dioxide, silicon dioxide, antimony trioxide, and/or
  (b) silicates such as mica, kaolin or talc, and or
  (c) boron nitride.

The weight average particle size of the nucleating agent is preferably comprised between 0.5 and 5.0 μm, more preferably between 0.7 and 2.0 μm. It may be present in an amount of 0.02-1.0 wt. %, more preferably of 0.05-0.2 wt. %.

It has been found that addition of a nucleating agent in PET may have negative effects on the resistance to hydrolysis of glass fibre reinforced PET composites.

A sizing according to the present invention enhances the mechanical properties measured dry as moulded (DAM) or measured after ageing in moist conditions (i.e., conditions promoting hydrolysis).

BRIEF DESCRIPTION OF THE FIGURES

For a fuller understanding of the nature of the present invention, reference is made to the following detailed description taken in conjunction with the accompanying drawings in which:

FIG. 4: shows graphs of the tensile strength as a function of hydrolysis time measured on GF-PET composites with (a) glass fibres of the prior art (GF) and according to the present invention (GF*) for two different types of PET matrices, and (b) glass fibres according to the present invention (GF*) with five different types of PET matrices.

FIG. 5: shows a graph of the tensile strength after 72 h hydrolysis of the samples represented in FIG. 4.

DETAILED DESCRIPTION OF THE INVENTION

Figure 3:
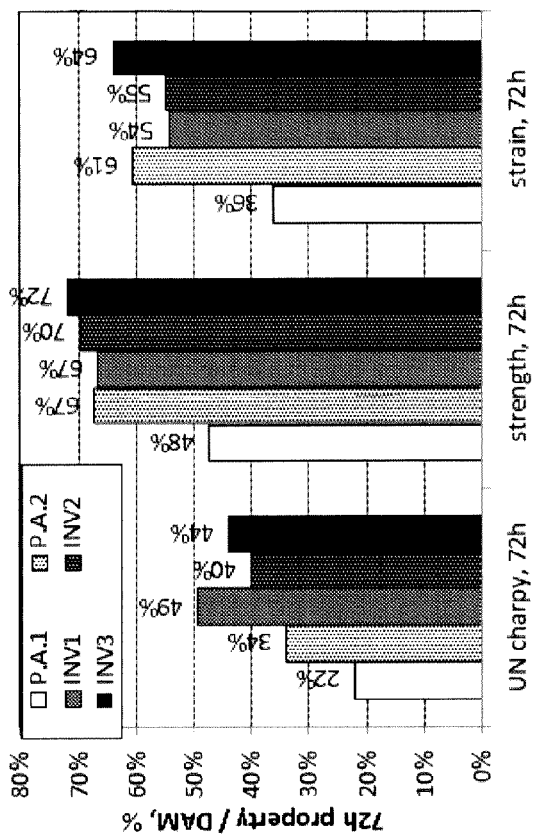
FIG. 3: shows a graph indicating the %-residual properties after 72 h hydrolysis relative to DAM for un-notched charpy, tensile strength and strain for the same samples as in FIGS. 1&2.

The sizing composition of the present invention is a two part composition comprising a precursor and a binder, which are applied to the surface of the glass fibres separately, in that order. The precursor comprises an aminosilane and a polymer or copolymer containing carboxylic acid and/or anhydride, both having a functionality, $F \geq 3$. The binder comprises a multifunctional epoxy resin of functionality, $F \geq 3$, so that, upon crosslinking, it can form a tri-dimensional network. Preferred multifunctional epoxy resins are epoxy phenol novolac (EPN) or epoxy cresol novolac (ECN), which should be present in the dry composition in an amount comprised between 30 and 90 wt. %, more preferably between 50 and 70 wt. %.

The aminosilane coupling agent preferably comprises monomeric or oligomeric (<6 units) silanes. Trialkoxysilanes are usually used as they permit to form a tri-dimensional network of Si—O—Si covalent bonds at the surface and around the surface of the glass fibres. Dialkoxysilanes, on the other hand, decrease the amount of inter-silane chains covalent bonds, and form a hair like structure at the surface of the glass fibres. Whilst a tri-dimensional silane network is generally recognized as improving resistance to hydrolysis of the fibre by the formation of a densely crosslinked protective sheath around the fibres, it also tends to form fibre clusters by reaction between silanes of adjacent fibres, which a polymeric matrix melt cannot impregnate completely. The hair like structure obtained with dialkoxysilanes, on the other hand, do not form a densely crosslinked protective sheath around the fibres, but facilitates impregnation of the fibre bundles and wetting of the individual fibres by a polymer melt. With a lower polarity than trialkoxysilane, dialkoxysilanes reduce the hydrophilicity of the surface of the glass fibres which is believed to contribute to an enhancement of the resistance to hydrolysis to a level comparable to trialkoxysilane based silanes. According to the present invention, trialkoxysilanes, dialkoxysilanes, and mixtures thereof can be used to form the silane coupling agent of the sizing, so that the crosslinking density around the glass fibres can be optimized at will. The silane based coupling agent should be present in an amount of 2 to 40 wt. % of total weight of sizing without water, preferably from 2.5 to 20.0 wt. %, more preferably from 5.0 to 15.0 wt. %.

Examples of aminosilanes which can be used alone or in combinations in the sizing of the present invention comprise:
  (a) aminodialkoxysilane, such as γ-aminopropylmethyldiethoxysilane, N-β-(Aminoethyl)-gamma-aminopropylmethyldimethoxysilane, N-β-(Aminoethyl)-γ-aminopropyl-methyldimethoxysilane, N-β-(Aminoethyl)-γ-aminoisobutylmethyldimethoxysilane, γ-aminopropylmethyldimethoxysilane, N-β-(Aminoethyl)-γ-aminopropyl-methyldiethoxysilane, and/or
  (b) aminotrialkoxysilane, such as γ-aminopropyltriethoxysilane, γ-aminopropyltri-methoxysilane, N-β-(Aminoethyl)-γ-aminopropyl-trimethoxysilane, N-β-(Aminoethyl)-γ-aminopropyltriethoxysilane, diethylene-triaminopropyltrimethoxysilane, Bis-(γ-trimethoxysilylpropyl) amine, N-phenyl-γ-aminopropyltrimethoxysilane, γ-amino-3,3-dimethylbutyltrimethoxysilane, γ-aminobutyltriethoxysilane, polyazamide silane.

A polymer or co-polymer containing anhydride, in particular maleic anhydride and/or a carboxylic acid of functionality greater than 2 ($F \geq 3$) are used as crosslinker of the sizing composition. Maleic anhydride and multifunctional epoxy resins of functionality, $F \geq 3$, such as EPN or ECN, have been used individually as alternative crosslinkers in many sizing compositions disclosed in the documents cited in the BACKGROUND ART section supra. To our knowledge, they have, however, never been used in combination before. The reasons for this are very simple. First, they are considered as alternative crosslinkers, fulfilling the same function, so that there is no apparent reason to mix them. Second, a (co-)polymer containing maleic anhydride which is soluble in water would generally form a highly unstable dispersion with any multifunctional epoxy resins, yielding a composition with limited reproducibility and shelf life. The latter problem is solved in the present invention by separating the maleic anhydride present in the precursor from the multifunctional epoxy resin present in the binder, such that the two components enter in contact with one another on the surface of the glass fibres. Examples of (co-)polymers containing anhydride comprise a copolymer ethylene-alt-maleic anhydride for example OC100LW.E from Michelman, copolymer butadiene-alt-maleic anhydride such as Maldene from Lindau Chemical, copolymer isobutylene-alt-maleic anhydride such as Isobam from Kuraray, copolymer acrylates-maleic anhydride such as Dicnal from DIC, and the like. Examples of (co-)polymers comprising carboxylic acid include polyacrylic acid such as Glascol C95 available from BASF. (Co-)polymers containing anhydride and carboxylic acid can be used alternatively or in combination. (Co-)polymers containing anhydride are preferred. The total amount of polymer or copolymer containing carboxylic acid and/or anhydride of functionality, $F \geq 3$ present in the dry composition is preferably comprised between 5.0 and 60.0 wt. %, more preferably between 15.0 and 30.0 wt. %.

The combination of both multifunctional epoxy resin and maleic anhydride and/or carboxylic acid (co-)polymer has surprisingly revealed advantageous. First, it increases the resistance to hydrolysis of a composite reinforced with glass fibres sized with such sizing. Without wishing to be bound by any theory, this is believed to be attributed to the dense crosslinked sheath formed around the glass fibres by reaction of epoxy groups with maleic anhydride groups. Furthermore, since both (co-)polymers containing maleic anhydride and epoxy resins are quite resistant to hydrolysis due to the mainly aliphatic nature of their respective backbones. By contrast, polyurethanes, usually used in combination with either a maleic anhydride or an epoxy novolac in the sizing compositions of the prior art, are themselves quite sensitive to hydrolysis. This could explain why such sizing compositions offer a weaker protection against hydrolysis to composite materials.

Second, by reacting with the epoxy groups, the maleic anhydride groups prevent the multifunctional epoxy resin from migrating into the polymeric matrix during the compounding or blending step in an extruder. It is important that as little multifunctional reactive components as possible migrate into the polymeric matrix, lest covalent bonds are formed in the matrix, which would increase the viscosity of the matrix. During the subsequent injection moulding operation, the shear forces generated increase with the viscosity of the blend, leading to the breakage of more glass fibres to the detriment of the mechanical properties of the thus injection moulded parts. Preventing the migration of the multifunctional epoxy resin such as EPN or ECN into the matrix is even more important in case the matrix is exposed to a thermal treatment such as solid state post-condensation (SSPC) after blending with the glass fibres, as such thermal treatments promote diffusion and crosslinking of such resins in the matrix.

A sizing according to the present invention preferably comprises a film former. A film former interacts with both the silane coupling agent and the matrix upon impregnation of the fibres. The film former must therefore be compatible with the matrix to be used. A film former protects the glass fibre from damage during processing (e.g., weaving, knitting, braiding, etc.) and promotes compatibility of the fibres with the matrix. It is not necessary that the film former forms any—or at least not extensive—covalent bonds with the silane coupling agent. It is actually even desirable to find film former molecules diluted in the matrix, as this is a sign of excellent compatibility between the two. Fibre reinforced composites are very sensitive to hydrolysis, and the mechanical properties of a composite exposed to hydrolysis conditions may drop by over 60% or more compared with the same properties measured dry as moulded (DAM). This substantial drop in mechanical properties upon exposure to hydrolysis conditions represents a major drawback of fibre reinforced composites. In many applications, such as outdoor applications in moist environments, or high temperature under the hood applications, the parts must be dimensioned taking account of these losses in mechanical properties, thus often becoming financially and technically (heavier) less competitive than alternative materials such as metals. Preferred film formers for a sizing according to the present invention comprise a polyurethane or a (meth-)acrylate polymer or co-polymer, or mixtures thereof. Other possible film formers, preferably admixed to one of the foregoing film formers, but also usable alone, comprise: an epoxy resin emulsion, preferably based on any of an epoxy bisphenol A or epoxy bisphenol F; an epoxy ester resin; an epoxy urethane resin; a polyamide; or mixtures thereof. The film former or mixture of film formers is preferably present in the precursor in an amount of 0.1 to 50.0 wt. % with respect to the total dry weight of the composition, more preferably 10.0 to 30.0 wt. %.

The sizing composition of the present inventions may comprise a number of additives, such as any of the following taken alone or in any combiation:

pH adjusters, such as bases, preferably ammonia or sodium hydroxide, and acids, preferably acetic acid or phosphoric acid, a non-ionic lubricant, preferably a fatty alcohols ethoxylated or fatty acid monoester of polyethylene glycol, such as PEG 200 Monolaurate, PEG 600 Monooleate, PEG 600 Monostearate, PEG 400 Monostearate PEG 400 Monooleate, PEG 600 Monolaurate, the non-ionic lubricant being preferably present in an amount of 0.1 to 30.0 wt. % solids, more preferably from 1.0 to 20.0 wt. % solids, most preferably from 2.0 to 5.0 wt. % solids;

a cationic lubricant, such as a polyethyleneimine polyamide salt, and is preferably present in the size composition in an amount from 0.1 to 30.0 wt. % solids, more preferably from 1.0 to 20.0 wt. % solids, most preferably from 2.0 to 5.0 wt. % solids, an antistatic agent, such as a quaternary ammonium, a tetraethylammonium chloride, or lithium chloride, and is preferably present in an amount of 0.1 to 5.0 wt. % solids, preferably from 0.5 to 1.5 wt. % solids.

anti-foaming agents, such as polysiloxane derivatives, the anti-foaming agent being preferably present in amount of less than 0.1% of total weight of sizing without water, an isocyanate based cross-linker, such as an isocyanurate, biuret, carbodiimide, the isocyanate based cross-linker being preferably present in amount of 0.1 to 50% of total weight of sizing without water, more preferably between 10 and 30.0 wt. %;

a boron-containing compound selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate and zinc tetrafluoroborate; the boron containing compound is preferably present in an amount of 0.1 to 50.0% with respect to the total dry weight of the composition, more preferably between 10.0 to 30.0 wt. %, most preferably between 2.5 and 10.0 wt. %;

a hypophosphite containing compound such as a hypophosphite salt or phosphite containing compound such as: sodium hypophosphite, ammonium hypophosphite, calcium hypophosphites, trisnonylphenyl phosphite.

The sizing composition can be applied to the surface of glass fibres as they are formed out of a bushing as an aqueous composition. It must be applied in two stages: a first coating station, generally comprising a roller contacting the fibres as they are running out of a bushing, for applying a precursor as discussed above, and a second station, applying a binder as discussed above. For chopped glass fibres, the precursor is usually applied to the fibres as they continuously run out of a bushing, whilst the binder is usually sprayed onto the chopped fibres The coated fibres are dried to evaporate the water to let the sizing composition react to form a sizing at the surface of the glass fibres. Sizing is generally applied to the surface of the glass fibres in an amount of 0.4 to 1.2 wt. % with respect to the total weight of glass fibres, preferably between 0.6 and 1.0 wt. %, more preferably between 0.8 and 09 wt. %. Unless otherwise indicated, all amounts of sizing and components in a sizing composition are expressed with respect to the total weight of sizing composition without any added water. In some cases, specifically indicated, as in the foregoing instance, Glass fibres according to the present invention, coated with a sizing as discussed above, are advantageously used to reinforce a polymeric matrix in composite materials. In particular, they can reinforce thermoplastic matrices in amounts comprised between 5 and 65 wt. %, preferably between 20 and 50 wt. %. The sizing of the present invention gives particularly good results with thermoplastic polyester matrices. Thermoplastic polyesters suitable for the present invention may be amorphous or a semi-crystalline. Preferably the thermoplastic polyester is a semi-crystalline polyester. Said semi-crystalline polyester is generally derived from at least one aromatic dicarboxylic acid or an ester-forming derivative thereof and at least one aliphatic, cycloaliphatic or aromatic diol, and includes homo- as well as copolymers. Examples of suitable aromatic diacids include terephthalic acid, isophthalic acid, naphthalene dicarboxylic acid, biphenyl dicarboxylic acid, etc., with terephthalic acid being preferred. Suitable diols include alkylane diols, benzene diol, dihydroxyphenyl, naphthalene diol. Alkane diols, like ethylene glycol, propylene glycol, 1,4-butane diol, neopentyl glycol, and cyclohexane dimethanol are preferred. These semi-crystalline polyesters may further comprise small amounts of, for example, aliphatic dicarboxylic acids, monofunctional alcohols and/or carboxylic acids and three or higher functional alcohols and/or carboxylic acids, provided that these polyesters remain melt-processable. Preferably, the content of other monomers in these polyesters is below 20 wt. %, more preferably below 10 wt. %, even more preferably below 5 wt. %, relative to the total weight of the polyester, to ensure the semi-crystallinity of the polyester.

Suitable thermoplastic polyesters that may be used in fibre reinforced composites according to the invention are, for example, polyalkyleneterephthalates, polyalkylene naphthalates, and polyalkylene bisbenzoates and any copolymers and any mixtures thereof. These polyesters can be derived from alkane diols and, respectively terephthalic acid, naphthalene dicarboxylic acid and 4,4'-diphenyldicarboxylic acid. Suitably, the polyalkyleneterephthalate is poly(1,4-cyclohexane-dimethylene terephthalate) (PCT) or a poly(alkylene terephthalate) based on an aliphatic diol with 2 to 6 carbon atoms, like polyethyleneterephthalate (PET), polytrimethyleneterephthalate (PTT), and poly(1,4-butylene terephthalate) or simply called polybutylene terephthalate (PBT). Suitable poly(alkylene naphthalate)s include polyethylenenaphthalate (PEN) and polybutylenenaphthalate (PBN). Suitable polyalkylene bisbenzoates include polyethylenebisbenzoate (PEBB) and polybutylenebisbenzoate (PBBB). Suitably, these semi-aromatic thermoplastic polyesters comprise a minority content of another dicarboxylic acid or diol. Of these polyesters, PET and PBT, and any mixture or copolymer thereof are preferred. More preferably the thermoplastic polyester is PET.

Glass fibres according to the present invention being coated with a sizing as described supra provide enhanced hydrolysis resistance to composite materials reinforced therewith, compared with glass fibre currently available on the market. Of course, resistance to hydrolysis also depends very much on the matrix. Surprisingly an increase in hydrolysis resistance has been obtained if the matrix is a thermoplastic polyester which has been subjected to a solid state post condensation process after blending with the glass fibres. A solid state post condensation (SSPC) process makes it possible to produce in a first step a thermoplastic polyester having a relatively low molecular weight and thus a correspondigly low viscosity. Because of the low viscosity glass fibre breakage is reduced during mixing of the glass fibres with the molten polyester. After the mixing of the glass fibres with the molten polyester, for example in an extruder, the so obtained mixture may be granulated to form pellets and cooled down.

Thereafter in a second step the actual solid state post condensation is carried out to increase the molecular weight of the polyester by subjecting the glass fibre reinforced polymer composition to a heat-treatment, preferably at a temperature close to, but below the melting point of the polyester, under reduced pressure and/or a flow of an inert gas. If the polyester is PET, the heat treatment preferably is carried out at a temperature between 160° C. and 245° C., more preferably between 170° C. and 240° C. The advantage of a higher temperature is that the time needed for obtaining the desired molecular weight is shorter. In a preferred embodiment, the inert gas atmosphere has a pressure of less than 10 kPa, more preferably less than 1 kPa, even more preferably less than 500 Pa. A lower pressure has the advantage that the required molecular weight is obtained in a shorter time. This allows a more efficient production process with a higher yield, without the need of extending the production installation.

The SSPC of the polymer composition according to the invention may be carried out by any mode and in any apparatus suitable for that purpose. The process may suitably be carried out as a batch process, for instance in a tumble dryer, or as a continuous process, for instance in a moving bed reactor.

In order to increase the crystallisation rate of the polyester, a nucleating agent is often needed. This is especially true if the polyester is PET. Unfortunately, the use of a nucleating agent was found to be somewhat detrimental to the hydrolysis resistance of fibre reinforced polyester composites. It was discovered, however, that the drop in hydrolysis resistance of polyester composites comprising nucleating agents could be limited if an inorganic nucleating agent was used. Examples of inorganic nucleating agents include metal oxides, like for example titanium dioxide, magnesium dioxide, silicon dioxide, antimony trioxide, silicates like for example mica, kaolin and talc, as well as boron nitrides. Preferably talc is used. Preferably the weight average particle size of the nucleating agent is 0.5-5.0 µm, more preferably 0.7-2.0 µm. The concentration is preferably 0.02-1 wt. %, more preferably 0.05-0.2 wt. %.

It was surprisingly discovered that a large increase in hydrolysis resistance of a glass fibre reinforced thermoplastic polyester composite could be obtained if the polyester matrix contains a stabilizer selected from a carbodiimide and/or an epoxy group containing stabilizer The addition of small amounts of such stabilizer even permits to compensate any drop in hydrolysis resistance caused by the use of a nucleating agent. The epoxy group containing stabilizer is preferably an epoxidized fatty acid ester or ether. In particular, epoxidized vegetable oils are suitable, such as epoxidized soybean oil or talloil, or most preferably epoxidized linseed oil. Mixtures of various of the foregoing epoxydized vegetable oils can be used. A stabilizer is preferably present in an amount of 0.1-5.0 wt. %, more preferably of 0.5-2.0 wt. % with respect to the total weight of matrix. Good results are obtained if the epoxidized stabilizer contains between 0.1 and 5 wt. % of oxirane oxygen, preferably between 0.3 and 5 wt. %.

In case extruded pellets of glass fibre reinforced polyester according to the present invention are subjected to a SSPC step, the stabilizer—preferably an epoxidized vegetable oil—is preferably dusted or sprayed onto the surface of the granulated composition after the SSPC step is completed. In this way no unwanted reactions between the epoxidized vegetable oil or the epoxidized modified vegetable oil can take place during the SSPC step.

EXAMPLE 1

Figure 1:
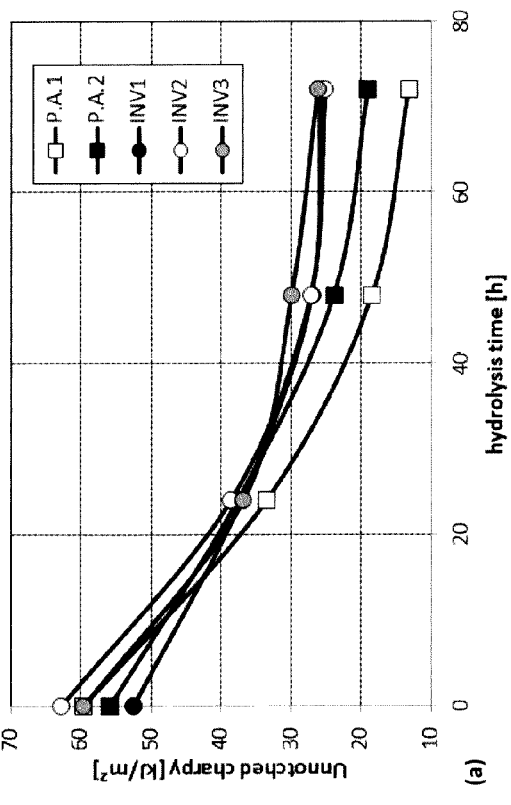
FIG. 1: shows graphs of un-notched Charpy test results (a) as a function of hydrolysis time and (b) after 72 h hydrolysis, measured on GF-PET composites according to the prior art (P.A.1 & P.A.2) and according to three embodiments of the present invention (INV1-3).
Figure 1:
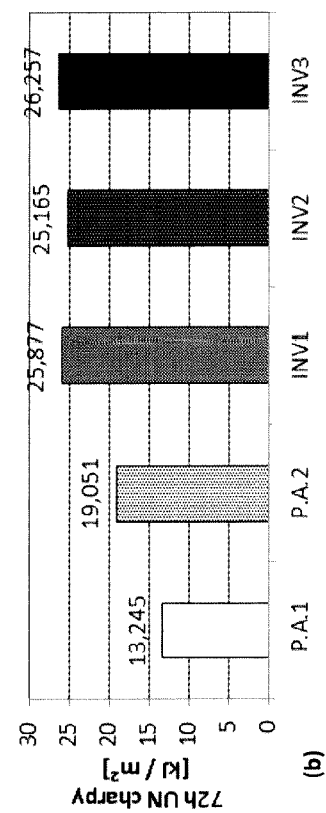
Figure 2:
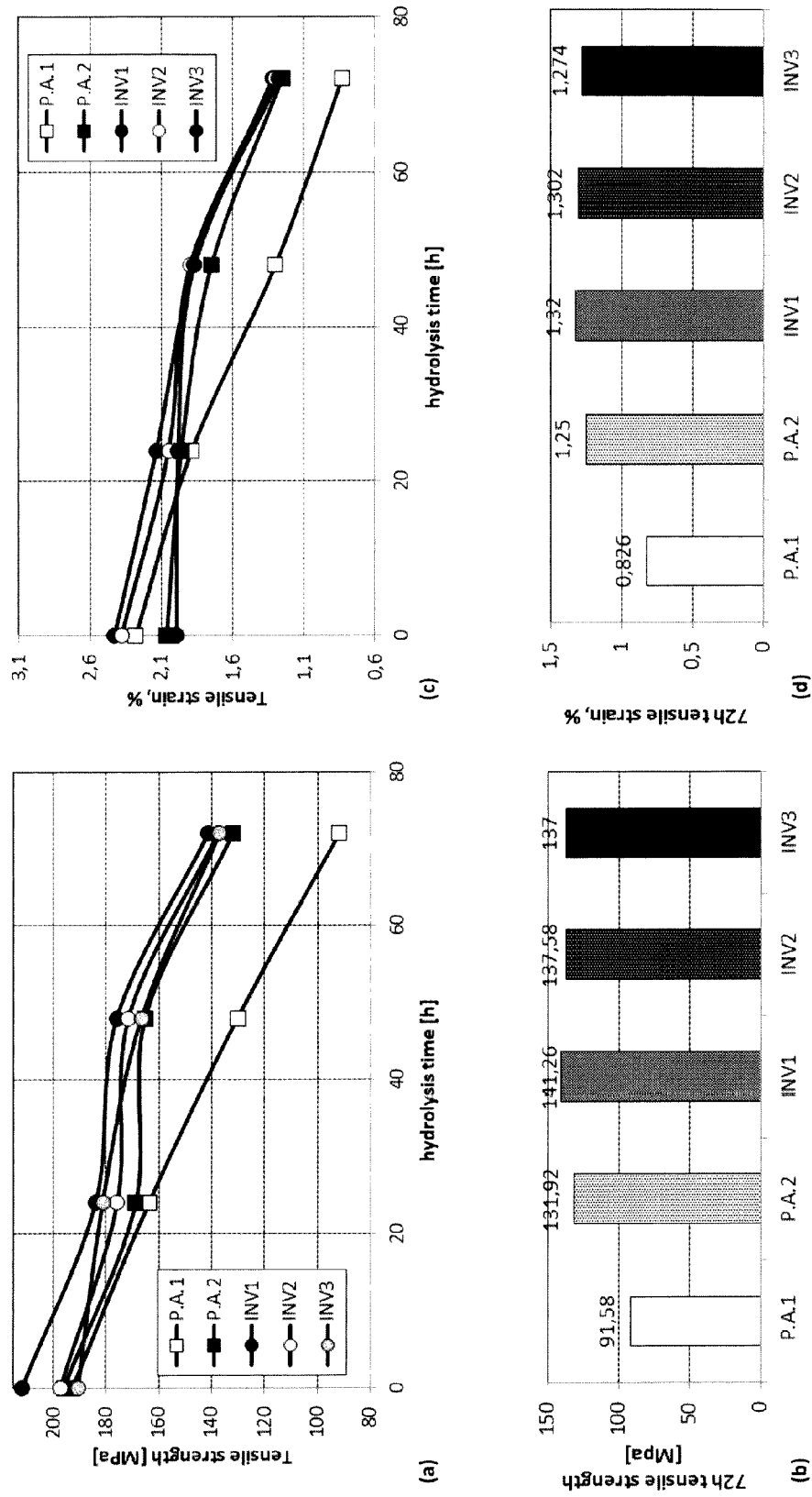
FIG. 2: shows graphs of the (a) tensile strength as a function of hydrolysis time, (b) tensile strength after 72 h hydrolysis, (c) tensile strain as a function of hydrolysis time, and (d) tensile strain after 72 h hydrolysis, measured on GF-PET composites according to the prior art (P.A.1 & P.A.2) and according to three embodiments of the present invention (INV1-3).

FIGS. 1 to 3 graphically illustrate mechanical tests results carried out on 35 wt. % chopped glass fibre reinforced PET composites using glass fibres of the prior art and fibres according to the present invention. All the samples comprised the same PET matrix: a PET homopolymer of relative viscosity of 1.34, measured according to ISO1628-5 on 1 g polymer dissolved in 125 g dichloroacetic acid at 25° C. The glass fibres of the prior art samples P.A.1 were glass fibres available on the market from PPG (ChopVantage™ HP 3786). The composition of the prior art glass fibres P.A.1 is not known but it is indicated as being optimized for reinforcing PET. The glass fibres of prior art sample P.A.2 and the ones according to the present invention were sized with different sizing compositions as listed in Table 1. Glass fibres and PET were blended using a lab size ZSK30 twin-screw extruder from Werner&Pfeiffer with a barrel temperature of 260-310° C. The PET polymer was dried before use (moisture content below 0.01%). The glass fibres were introduced via a side-feeder into the polymer melt. Extruded strands were cooled in water and granulated to form granules (or pellets) of PET reinforced with 35 wt. % of glass fibres. Test samples were produced by injection moulding the thus produced glass fibre-PET granules. The samples were tested dry as moulded (DAM) and after 24, 48, 72 h accelerated ageing in water steam (500 ml demineralised water) at 110° C. at a pressure of 1.4 bar (140 kPa) in a pressure vessel. Each mechanical value is the average over ten repetitions of the test.

TABLE 1 compositions of the sizings on glass fibres of samples INV1-3 represented in Figures 1 to 3.

|  | P.A.2 | INV1 | INV2 | INV3 |
|---|---|---|---|---|
| Precursor | 0.06 wt. % silane[1] | 0.06 wt. % silane[1] | 0.06 wt. % silane[1] | 0.1 wt. % silane[1] |
|  | 0.2 wt. % PU406[5] | 0.2 wt. % EMA[2] | 0.2 wt. % EMA[2] | 0.2 wt. % EMA[2] |
|  |  |  | 0.036 wt % STFB[3] | 0.06 wt % STFB[3] |
| Binder | 0.6 wt. % EPN | 0.6 wt. % EPN[4] | 0.6 wt. % EPN[4] | 0.6 wt. % EPN[4] |

All wt. % expressed as dry weight of a component with respect to the weight of GF on which the composition is applied.
[1]Silane = γ-aminopropyl triethoxysilane, A1100 from Momentive.
[2]EMA = copolymer of ethylene maleic anhydride OC100LW.E from Michelman.
[3]STFB = sodium tetrafluoroborate.
[4]EPN = Epoxy phenol novolac, Epirez 5054 from Momentive.
[5]PU406 = polyether based polyurethane from Bayer.

FIG. 1 illustrates the test results measured on prior art samples P.A.1 and P.A.2, and on samples INV1, INV2, and INV3 according to the present invention with the un-notched Charpy test (=UN-Charpy) according to ISO 179-2/1Eu. FIG. 1(a) plots the results as a function of exposure time to hydrolysis conditions, and FIG. 1(b) represents the UN-Charpy values measured after 72 h exposure to hydrolysis conditions, corresponding to the last points on the right hand side of FIG. 1(a). It can be seen in FIG. 1(a) that the resistance to hydrolysis of the composite materials reinforced with glass fibres according to the present invention is clearly superior to the prior art composites, with values after 72 h accelerated hydrolysis superior to 25 kj/m² for the inventive samples against values inferior to 20 kj/m² for the prior art samples, with a low 13.2 kj/m² for the commercial composite, P.A.1, nearly half the value of the inventive composites. The first set of columns on the left hand side of FIG. 3 represents the residual UN-Charpy results after 72 h exposure to hydrolysis conditions, expressed in % with respect to the value measured DAM, i.e., UN-Charpy (72 h)/UN-Charpy (DAM)×100%. It can be seen that the composite samples according to the present invention retain between 40 and 49% of the initial (DAM) properties, whilst the prior art samples retain only 22% for P.A.1 and 34% for P.A.2, thus representing a drop of 66 to 78% of the initial (DAM) properties. It can be seen from FIG. 1(a) that samples INV1, INV2, INV3 differ in their UN-Charpy results solely in the DAM conditions (i.e., hydrolysis time=0 h) with a DAM UN-Charpy value of 52.5 kJ/m² for sample INV1, 62.7 kJ/m² for INV2, comprising 0.036 wt. % sodium tetrafluoroborate (STFB), and a little drop down to 59.6 kJ/m² for INV3, containing a higher amount of aminosilane (0.1 wt %) and STFB (0.06 wt. %). The results after 72 h accelerated hydrolysis are, however, quite constant for the three inventive examples, INV1-3 (cf. FIG. 1(b)).

FIG. 2 represents the tensile tests values measured according to ISO 527-2 on dog bone samples of the same composite materials as discussed with respect to FIG. 1. Apart from sample INV1 with a value over 210 MPa, the tensile strength measured DAM is not substantially affected by the type of sizing used (cf. FIG. 2(a)). On the other hand, the tensile strength after hydrolysis is much improved with the sizing according to the present invention compared with the commercial composite P.A.1, and a little better than P.A.2 sample, with 5 to almost 10 MPa higher strength values for the inventive samples than for the P.A.2 after 72 h hydrolysis (cf. FIG. 2(b)). It is interesting to note that, simply replacing polyurethane of the sizing of P.A.2 by ethylene maleic anhydride to yield sizing INV1, allows a considerable increase of the tensile strength measured DAM of the composites from 196 MPa for P.A.2 to 212 MPa for INV1. Tensile strain at rupture is also strongly influenced by the sizing composition, as can be seen in FIG. 2(c)&(d) with commercial sample P.A.1 breaking at a strain of 0.83% after 72 h hydrolysis, whilst the other samples have a strain at rupture higer than 1.27%. FIG. 3 shows in the last two groups of columns in the right hand side, that the residual tensile strength and strain after 72 h is much inferior for the commercial product P.A.1 than for the inventive samples INV1-3 which have values comparable with the ones of P.A.2 sample.

Example 1 and FIGS. 1 to 3 demonstrate the advantageous effect of sizings according to the present invention on the mechanical properties measured both DAM and after exposure to accelerated hysdrolysis conditions on composites reinforced with various embodiments of glass fibres according to the present invention and of the prior art reinforcing the same PET matrix. Example 2 will show how the increase in properties of the inventive composites can further be enhanced by modifying the matrix to adapt it to the sizing.

EXAMPLE 2

Various composite samples were tested with glass fibres, GF, according to the prior art and glass fibres, GF*, according to the present invention reinforcing a PET matrix having a relative viscosity (RSV) of 1.34, and having undergone a number of preferred treatments: solid state post condensation step (SSPC), addition of a stabilizer, and addition of a nucleating agent. The compositions are listed in Table 2.

TABLE 2 compositions of the samples of Example 2 and FIGS. 4 & 5

|  | Glass fibre | SSPC | Stabilizer | Nucleating agent |
| --- | --- | --- | --- | --- |
| INV GF – PET | GF*[(1)] | No | — | — |
| P.A. GF – (PET + SSPC) | GF[(2)] | Yes[(3)] | — | — |
| INV GF* – (PET + SSPC) | GF* | yes | — | — |
| P.A. GF – (PET + SSPC + 0.5 ELO) | GF | yes | 0.5 wt. % ELO[(4)] | — |
| INV GF* – (PET + SSPC + 0.5 ELO) | GF* | yes | 0.5 wt. % ELO | — |
| INV GF* – (PET + SSPC + 0.5 ELO + talc) | GF* | yes | 0.5 wt. % ELO | 0.1 wt. % talc[(5)] |
| INV GF* – (PET + SSPC + 1.3 ELO + talc) | GF* | yes | 1.3 wt. % ELO | 0.1 wt. % talc |

[(1)]GF* is a glass fibre sized with a composition according to INV1 (cf. Table 1)
[(2)]GF is a commercial glass fibre ChopVantage ™ HP 3786, available from PPG Industries Fibre Glass.
[(3)]SSPC = solid state post condensation carried out on the GF – PET pellets as explained below.
[(4)]epoxidized linseed oil, Lankroflex E2447, available from Akcros Chemicals.
[(5)]talc, Microtalc MP 1250, available from Barretts Minerals Inc.

Glass fibres and PET were blended using a ZE40A UTX twin-screw extruder from Berstorff with a barrel temperature of 260-310° C., screw speed of 300 RPM and a yield of 180 kg/hour. The PET base polymer was dried before use (moisture content below 0.01%). Components such as PET, nucleating agent and mould release agent (0.35 wt. % of Carnauba wax available from Paramelt) were dosed to the hopper as a pre-blend. The glass fibres were introduced via a side-feeder into the polymer melt. Extruded strands were cooled in water and granulated to form pellets of PET reinforced with 35 wt. % of glass fibres.

Some of the glass fibre-PET pellets were heat treated according to a preferred embodiment of the present invention to provoke solid state post condensation (SSPC). SSPC was performed in a 100 litre tumble-drier unit. The drier was charged with 25 kg glass fibre-PET granules and pressure was reduced to 80 mbar (8 kPa), vented with pure, dry nitrogen and temperature raised initially to 120° C. After 1 hour at 120° C. pressure was reduced to 4 mbar and temperature was raised to 135° C. After 1 hour the temperature of the granules was raised to 205° C., while pressure was kept at 4 mbar (0.4 kPa) and vented with nitrogen. The granules were maintained at these conditions for between about 10 and 24 hours until a target relative solution viscosity (RSV) of 1.43 had been reached. After this period, the samples were cooled down to room temperature.

A stabilizer was added to the granule surface of some of the samples after the SSPC treatment. The stabilizer was epoxidized linseed oil (ELO) added to the glass fibre-PET pellets in a tumble-drier at 23° C. under a nitrogen flow, and then heated up to 140° C. while rotating. After 2 hours the material was cooled down to room temperature.

Tensile test dogbone testbars according to the ISO 527-1A standard were injection moulded from pre-dried (10 hours at 120° C. under vacuum with nitrogen flow) granules on an Arburg 110 injection moulding machine, with temperature settings 260-270° C., and mould temperature of 140° C. Some of the tensile testbars were exposed to accelerated hydrolysis conditions in a hot steam atmosphere in an autoclave at a temperature of 110° C. and a pressure of 1.4 bar for various times: 24, 48, and 72 hours.

FIG. 4(a) illustrates the tensile strength as a function of hydrolysis time for various samples according to the invention (black and white circles) and to the prior art (black and white squares), wherein glass fibre-PET granules underwent only an SSPC step (cf. white symbols) and were dusted with 0.5 wt. % ELO after SSPC (black symbols). It can be seen that the DAM properties are approximately constant for all the samples represented in the Figure. Tensile strength after 72 h hydrolysis, however, is much superior for the composite samples reinforced with glass fibres according to the present invention (cf. circles), than for the prior art samples (cf. squares) confirming the results discussed in Example 1. By comparing the white and black symbols for the circles and squares, respectively represented in FIG. 4(a), it can be seen that dusting the granules with ELO after SSPC increases the resistance to hydrolysis of the samples. Surprisingly, it can be seen that the enhancement in resistance to hydrolysis brought by the presence of ELO is much more pronounced for the composites reinforced with glass fibres according to the present invention than for the ones reinforced with commercial glass fibres (compare the difference between white and black circles (INV) with the difference between white and black squares (P.A.) after 72 h hydrolysis). The inventive sample "INV GF*–(PET+SSPC+ELO)" (=black circle) lost less than 20% of its initial mechanical strength (DAM), dropping from 188 MPa to 153 MPa, compared with a loss of well over 50% of their initial properties (DAM) from 185 MPa down to 91 MPa for sample "P.A. GF–(PET+SSPC+ELO)" (black squares) and even down to 81 MPa without ELO for sample "P.A. GF–(PET+SSPC)" (=white squares).

FIG. 4(b) represents the tensile strength as a function of hydrolysis time for samples all reinforced with glass fibres according to the present invention, and with the same PET matrix, but the latter was treated according to various preferred embodiments. Sample "INV GF*–PET" (=white squares) was not subjected to SSPC, and did not contain any stabilizer nor any nucleating agent. The samples "INV GF*–(PET+SSPC)" (=white circles) and "INV GF*–(PET+SSPC+0.5 ELO)" (=black circles) are the same as in FIG. 4(a). The samples "INV GF*–(PET+SSPC+0.5 ELO+talc)" and "INV GF*–(PET+SSPC+1.3 ELO)" contained talc as nucleating agent and were dusted with 0.5 wt. % and 1.3 wt. % ELO, respectively.

It can be seen that the DAM properties are approximately constant for all the samples represented in FIG. 4(b). Tensile strength after 72 h hydrolysis, however, very much depends on the treatment of the matrix. FIG. 5 illustrates the tensile strength after 72 h exposure to accelerated hydrolysis conditions for the samples plotted in FIG. 4(a)&(b) (prior art samples=white columns, and inventive samples=shaded columns).

The effect of SSPC on the resistance to hydrolysis is clearly visible by comparing the white square (no SSPC) with the white circle (with SSPC) after 72 h hydrolysis in FIG. 4(b) and by comparing the first two shaded columns in FIG. 5, wherein the tensile strength after 72 h hydrolysis rises from 89 MPa without SSPC to 120 MPa with SSPC. The effect of SSPC is stronger on composites reinforced with glass fibres according to the present invention as with the prior art glass fibres, as can be seen by comparing the white squares (P.A.) with the black square (INV) after 72 h hydrolysis in FIG. 4(a) and by comparing the white and shaded columns of the second group in FIG. 5 entitled "GF–(PET+SSPC)", with 81 MPa residual strength for the prior art product compared with 120 MPa for the inventive sample.

Dusting of epoxydized linseed oil (ELO) as stabilizer onto the glass fibre-PET granules prior to injection moulding the dogbone testbars yields an increase in hydrolysis resistance of the prior art and inventive samples (compare second—"GF–(PET+SSPC)"—and third groups—"GF–(PET+SSPC+0.5 ELO)"—of columns in FIG. 5), with a 12% rise of the tensile strength of the prior art samples from 81 MPa without stabilizer to 91 MPa with 0.5 wt. % ELO, and an extraordinary 28% rise of the tensile strength of the inventive samples from 120 MPa without stabilizer to 153 MPa with 0.5 wt. % ELO. These results are representative of a clear synergy between the glass fibres of the present invention and the addition of a stabilizer to a polyester after an SSPC step. Without wishing to be bound by any theory, it is believed that anhydride functions of the EMA copolymer still available after extrusion and SSPC react with the epoxy functions of ELO during injection moulding of a part. These reactions are believed to enhance the coupling between matrix and glass fibres, and therefore enhance hydrolysis resistance of the interface. This phenomenon is much reduced in the commercial prior art sample with an increase of the tensile strength after 72 h accelerated hydrolysis of merely 10 MPa with the addition of 0.5 wt. % ELO.

The use of a nucleating agent is often required to bring the crystallization rate of polyesters in line with the process cycle. It is preferred to use an inorganic nucleating agent. In the examples, talc was used, yielding a 25% drop of the tensile strength after 72 h hydrolysis, as can be seen by comparing samples "INV GF–(PET+SSPC+0.5 ELO)" and "INV GF–(PET+SSPC+0.5 ELO+talc)" in FIG. 5, from 153 MPa down to 114 MPa. Replacing talc by an organic nucleating agent, viz., sodium benzoate, dropped the mechanical properties even lower down to a tensile strength of 74 MPa (not shown in the Figures). For this reason, it is preferred that, if required, a nucleating agent should preferably be selected among inorganic compounds.

The drop in tensile strength after hydrolysis caused by the addition of a nucleating agent can be compensated totally by increasing the amount of stabilizer as can be seen in FIG. 5 by comparing the last two shaded columns on the right hand side both comprising talc as nucleating agent and differing in the amount of ELO, wherein the residual tensile strength rises from 114 MPa with samples comprising 0.5 wt. % ELO to 155 MPa (+36%) with samples comprising 1.3 wt. % ELO.

The invention claimed is:

1. A process for applying a two-part sizing composition onto a surface of glass fibres, said process comprising the following steps:
   forming glass fibres out of a bushing,
   applying a precursor of said two-part sizing composition onto the surface of the glass fibres at a first application station, wherein said precursor comprises:
   (a) an aminosilane present from 2.5 to 20.0 wt. % of said two-part sizing composition and
   (b) a polymer or copolymer containing carboxylic acid and/or anhydride, both having a functionality, $F \geq 3$,
   then applying a binder of said two-part sizing composition onto the surface of the glass fibres at a second application station, wherein said binder comprises a multifunctional epoxy resin of functionality, $F \geq 3$, and allowing said two-part sizing composition to react and form a sizing covalently bound to the surface of the glass fibres.

2. The process according to claim 1, wherein the glass fibres are chopped into chopped fibres after the application of the precursor, which is applied with a roller and before the application of the binder, which is applied by spraying, thus forming glass fibre pellets.

3. The process according to claim 1, wherein the anhydride contained in said polymer or copolymer is maleic anhydride, and/or the carboxylic acid contained in said polymer is a polyacrylic acid, and wherein the total amount of polymer or copolymer containing carboxylic acid and/or anhydride of functionality, F ≥3 is present in said two-part sizing composition in an amount comprised between 15.0 and 30.0 wt. %.

4. The process according to claim 1, wherein said multifunctional epoxy resin, comprises a novolac type epoxy and wherein it is present in said two-part sizing composition in an amount comprised between 50 and 70 wt. %.

5. The process according to claim 1, wherein the aminosilane is selected from one or more of an:
aminodialkoxysilane, selected from the group consisting of: γ-aminopropylmethyldiethoxysilane, N-β-(Aminoethyl)-gamma-aminopropylmethyldimethoxysilane, N-β-(Aminoethyl)-γ-aminopropyl-methyldimethoxysilane, N-β-(Aminoethyl)-γ-aminoisobutylmethyldimethoxy-silane, γ-aminopropylmethyldimethoxysilane, and N-β-(Aminoethyl)-γ-aminopropyl-methyldiethoxysilane; and /or
aminotrialkoxysilane, selected from the group consisting of: γ-aminopropyltriethoxysilane, γ-aminopropyltrimethoxysilane, N-β-(Aminoethyl)-γ-aminopropyltrimethoxysilane, N-β-(Aminoethyl)-γ-aminopropyltriethoxysilane, diethylenetriaminopropyltrimethoxysilane, Bis-(γ-trimethoxysilylpropyl) amine, N-phenyl-γ-aminopropyltrimethoxysilane, γ-amino-3, 3-dimethylbutyltrimethoxysilane, γ-aminobutyltriethoxysilane, polyazamidesilane.

6. The process according to claim 1, wherein the two-part sizing composition further comprising one or more additives of:
a film former optionally comprising a polyurethane or a (meth)acrylate polymer or co-polymer, or mixtures thereof, said film former being present in the precursor in an amount of 0.1 to 50.0 wt. % with respect to the total dry weight of the composition;
pH adjusters;
a non-ionic lubricant, selected from a fatty alcohols ethoxylated or fatty acid monoester of polyethylene glycol, said non-ionic lubricant being present in an amount of 0.1 to 30.0 wt. % solids;
a cationic lubricant present in the size composition in an amount from 0.1 to 30.0 wt. % solids;
an antistatic agent, selected from a quaternary ammonium, a tetraethylammonium chloride, or lithium chloride, said antistatic agent being present in an amount of 0.1 to 5.0 wt. % solids;
anti-foaming agents present in an amount of less than 0.1% of total weight of sizing without water;
an isocyanate based cross-linker present in an amount of 0.1 to 50% of total weight of sizing without water; and
a boron-containing compound selected from the group consisting of boric acid, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium, tetrafluoroborate and zinc tetrafluoroborate; said boron containing compound being present in an amount of 0.1 to 50.0% with respect to the total dry weight of the composition.

\* \* \* \* \*